United States Patent
Couwenhoven et al.

(10) Patent No.: US 7,196,817 B2
(45) Date of Patent: *Mar. 27, 2007

(54) PRINTING OF DIGITAL IMAGES USING REDUCED COLORANT AMOUNTS WHILE PRESERVING PERCEIVED COLOR

(75) Inventors: Douglas W. Couwenhoven, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 883 days.

This patent is subject to a terminal disclaimer.

(21) Appl. No.: 10/317,778

(22) Filed: Dec. 12, 2002

(65) Prior Publication Data

US 2004/0114159 A1  Jun. 17, 2004

(51) Int. Cl.
*G06F 15/00* (2006.01)

(52) U.S. Cl. ............... 358/1.9; 358/3.01; 358/3.23; 358/502; 358/515; 358/518; 358/521; 382/162; 382/163; 382/167

(58) Field of Classification Search ............. 358/1.9, 358/1.14, 2.99, 3.01, 3.23, 518, 515, 521; 382/162, 163, 167

See application file for complete search history.

(56) References Cited

U.S. PATENT DOCUMENTS

| 4,930,018 | A | | 5/1990 | Chan et al. |
| 5,012,257 | A | | 4/1991 | Lowe et al. |
| 5,333,243 | A | * | 7/1994 | Best et al. .................... 358/1.9 |
| 5,515,479 | A | | 5/1996 | Klassen |
| 5,553,199 | A | | 9/1996 | Spaulding et al. |
| 5,563,985 | A | | 10/1996 | Klassen et al. |
| 5,608,824 | A | * | 3/1997 | Shimizu et al. ............. 382/276 |
| 5,633,662 | A | | 5/1997 | Allen et al. |
| 5,881,209 | A | * | 3/1999 | Stokes ........................ 358/1.9 |
| 6,057,932 | A | * | 5/2000 | Yoshida et al. .............. 358/1.9 |
| 6,081,340 | A | * | 6/2000 | Klassen ....................... 358/1.1 |
| 6,435,657 | B1 | * | 8/2002 | Couwenhoven et al. ...... 347/43 |
| 6,697,498 | B2 | * | 2/2004 | Kawaguchi et al. ......... 382/100 |
| 6,972,857 | B2 | * | 12/2005 | Mantell et al. ............ 358/1.14 |
| 2003/0098986 | A1 | * | 5/2003 | Pop ............................ 358/1.9 |
| 2006/0056683 | A1 | * | 3/2006 | Komatsu .................... 382/162 |

* cited by examiner

*Primary Examiner*—Kimberly Williams
*Assistant Examiner*—Beniyam Menberu
(74) *Attorney, Agent, or Firm*—Raymond L. Owens (57) ABSTRACT

A method for modifying an input digital image having an (x,y) array of image pixels, each image pixel having an input code value for each of four or more color channels, to produce a depleted digital image subject to a total colorant amount limit. The method includes determining depleted code values for each color channel such that the depleted code values produce substantially the input perceived color according to a device color model.

18 Claims, 4 Drawing Sheets

PRINTING OF DIGITAL IMAGES USING REDUCED COLORANT AMOUNTS WHILE PRESERVING PERCEIVED COLOR

CROSS REFERENCE TO RELATED APPLICATIONS

Reference is made to commonly assigned U.S. patent application Ser. No. 09/213,637 filed Dec. 17, 1998 by Douglas W. Couwenhoven, et al., entitled "Colorant Reduction Method for Digital Images"; commonly assigned U.S. patent application Ser. No. 09/881,460 filed Jun. 14, 2001 by Douglas W. Couwenhoven, et al., entitled "Method for Multilevel Printing of Digital Images Using Reduced Colorant Amounts"; commonly assigned U.S. patent application Ser. No. 10/309,866 filed Dec. 4, 2002 by Douglas W. Couwenhoven, et al., entitled "Calibrating a Digital Printer Using a Cost Function"; commonly assigned U.S. patent application Ser. No. 10/310,009 filed Dec. 4, 2002 by Gustav J. Braun, et al., entitled "Color Gamut Mapping Using a Multidimensional Cost Function"; and commonly assigned U.S. patent application Ser. No. 10/845,037 filed May 13, 2004 by Gustav J. Braun, et al., entitled Determining Sets Of N-Dimensional Colorant Control Signals, the disclosures of which are herein incorporated by reference.

FIELD OF THE INVENTION

This invention pertains to the field of digital imaging, and more particularly to a colorant reduction method used during the process of printing a digital image.

BACKGROUND OF THE INVENTION

In the field of digital printing, a digital printer receives digital data from a computer and places colorant on a receiver to reproduce the image. A digital printer may use a variety of different technologies to transfer colorant to the page. Some common types of digital printers include inkjet, thermal dye transfer, thermal wax, electrophotographic, and silver halide printers.

Often when printing digital images, undesirable image artifacts may result when an excessive amount of colorant is placed in a small area on the page. These image artifacts degrade the image quality, and can result in an unacceptable print. In the case of an inkjet printer, some examples of these image artifacts include bleeding, cockling, banding, and noise. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver may warp to such an extent as to interfere with the mechanical motions of the printer, potentially causing damage to the printer. Banding refers to unexpected dark or light lines or streaks that appear running across the print, generally oriented along one of the axes of motion of the printer. Noise refers to undesired density or tonal variations that can give the print a grainy appearance, thus degrading the image quality. Although these artifacts are presented in the context of an inkjet printer, it is known to those skilled in the art that similar artifacts commonly exist with the other above mentioned printing technologies also.

In a digital printer, satisfactory density and color reproduction can generally be achieved without using the maximum possible amount of colorant. Therefore, using excessive colorant not only introduces the possibility of the above described image artifacts occurring, but is also a waste of colorant. This is disadvantageous, since the user will get fewer prints from a given quantity of colorant.

It has been recognized in the art that the use of excessive colorant when printing a digital image needs to be avoided. Generally, the amount of colorant needed to cause image artifacts (and therefore be considered excessive) is receiver, colorant, and printer technology dependent. Many techniques of reducing the colorant amount are known for binary printers in which a halftoning process is used (typically inside a software printer driver program) to convert input digital image data into "on" or "off" states at each pixel. In such printers, the input image to the halftoning process is a higher bit precision image, typically 8 bits (or 256 levels) per pixel, per color.

U.S. Pat. No. 4,930,018 to Chan, et al. teaches a method of reducing paper cockle and graininess of inkjet prints utilizing multiple inks with different dye loadings. In this method, a given gray level can be reproduced a variety of different ways, some of which will use more colorant than others. The different ways to reproduce a given gray level are rank ordered according to the total ink coverage, and a selection is made by iterating through the order until one is found that satisfies a specified maximum coverage limit.

U.S. Pat. No. 5,515,479 to Klassen teaches a method for reducing marking material (i.e., ink) coverage in a printing process by determining the ink coverage for each pixel in an image, determining if too much ink will be placed on the page in a given area, and reducing the amount of ink to an acceptable level by turning "off" a fraction of the pixels in the given area. The determination of which pixels to turn off is made by using a processing order through each area which tends to randomize the turn off effect. While this method successfully reduces the amount of ink placed on the page in a given area, it can introduce pattern noise into the image because of the processing order method of selecting which pixels to turn off. Also, the pixels that are turned off in each color separation are not correlated, which can lead to a grainy appearance to an image region that should appear otherwise uniform.

U.S. Pat. No. 5,563,985 to Klassen, et al. addresses the problem of pattern noise by selecting which pixels to turn off in response to a random number function. While this method successfully eliminates pattern noise that can be generated in a given area, it can introduce random noise into the image because the selection of which pixels to turn off is determined by a random process. While this may be visually less objectionable than pattern noise, it is still not optimal.

U.S. Pat. No. 5,012,257 to Lowe, et al. describes a "superpixel" printing strategy to reduce bleed across color field boundaries. This strategy limits printing to no more than two drops of ink per cell or pixel, and no more than a total of three drops per superpixel, where a superpixel consists of a 2×2 array of pixel cells. This strategy controls bleed, but at a penalty in terms of color and spatial resolution.

U.S. Pat. No. 6,081,340 to Klassen teaches a method for reducing marking material (i.e., ink) coverage in a printer that has a nonlinear marking material coverage. As understood, this method applies to a halftoned image signal where the number of gray levels in the image has been reduced to match the number of available printing levels in the printer. A coverage calculator is then used to determine the amount of marking material that is present in a local 8×8 region of the current pixel. This method is disadvantaged because it operates after the halftoning process, and is therefore required to sample a region of the halftoned image data in order to estimate the marking material coverage, which can be time consuming. Also, the process of reducing the marking material coverage is limited to turning off integer numbers of discrete dots, therefore limiting the fidelity of the reduction step.

The above mentioned references teach methods of reducing artifacts associated with excessive colorant usage by utilizing methods that operate on the digital data after halftoning. That is, the above techniques operate primarily on bitmaps of image data where each pixel is represented by a code value of 0 ("off", meaning no colorant), or 1 ("on", meaning full colorant). At this point in the imaging chain of a digital printer, much information has been lost due to the halftoning process, and accurately controlling the total colorant amount becomes more costly and less accurate relative to a pre-halftoning algorithm. U.S. Pat. No. 5,633,662 to Allen, et al. teaches a method of reducing colorant using a pre-halftoning algorithm that operates on higher bit precision data (typically 256 levels, or 8 bits per pixel, per color). However, this method is intended for a binary printer where the halftone dot area is substantially linear with digital code value, and therefore the amount of colorant placed on the page is substantially linear with the digital code values that are used to drive the printer. In general, this arrangement will not be optimal for a multilevel printer where the colorant amount is typically not linear with digital code value.

None of these colorant reduction methods will preserve the perceived color (e.g., the CIE colorimetry) of the image. As a result, the reduced colorant image will generally not match the appearance of the original image. Therefore, any color correction transforms (e.g., color management profiles) that are applied to the input image in order to achieve a desired color must be computed using characterization data where any color patches have been processed through the final colorant reduction process. This implies that any change in the colorant reduction process will require that the printer be re-characterized and that the color correction transform be recomputed.

Thus, there is a need for a color-preserving colorant reduction algorithm that can be applied to a color printer to provide for high quality images free from the artifacts associated with using excess colorant.

SUMMARY OF THE INVENTION

It is an object of the present invention to provide for printing high quality digital images that are free of the above-described artifacts associated with using excessive amounts of colorant.

It is a further object of the present invention to reduce the amount of colorant used to print an image in a manner that substantially preserves the color of the image, thereby making it unnecessary to adjust any color correction transforms used in the printing system.

It is a further object of the present invention to reduce the amount of colorant used to print an image on a multilevel printer in which the colorant amount may not be linear with digital code value.

These objects are achieved by a method for modifying an input digital image having an (x,y) array of image pixels, each image pixel having an input code value for each of four or more color channels, to produce a depleted digital image having depleted code values that substantially preserve perceived color and which are subject to a total colorant amount limit, comprising the steps of:

a) determining an input perceived color corresponding to the input code values using a device color model;

b) determining an input colorant amount for each color channel in response to the corresponding input code value and a colorant amount function that relates the input code value to the colorant amount for the corresponding color channel;

c) determining a total input colorant amount by combining the input colorant amounts for each color channel;

d) for image pixels where the total input colorant amount exceeds the total colorant amount limit, determining depleted code values for each color channel such that the depleted code values produce substantially the input perceived color according to the device color model and wherein the total colorant amount corresponding to the depleted code values is less than or equal to the total colorant amount limit; and e) repeating steps (a) through (d) for a plurality of pixels in the input digital image.

ADVANTAGES

The present invention has an advantage in that it provides for reducing the amount of colorant while substantially preserving the perceived color of the image, thereby making it possible to adjust the colorant reduction process without modifying any color correction transforms used in the printing process. Another advantage of the present invention is that it can be applied to multilevel printers in which the colorant amount is not necessarily linear with digital code value. Yet another advantage of the present invention is that the maximum amount of colorant is more accurately controlled for a multilevel printer relative to the prior art methods, providing for improved control over image artifacts associated with using excess colorant. It is a feature of the present invention that colored images are produced which are esthetically pleasing and free from the above-described artifacts.

DETAILED DESCRIPTION OF THE INVENTION

This invention represents a method for reducing the amount of colorant used in printing a digital image to avoid undesirable image artifacts that degrade the image quality of a digital print while simultaneously substantially preserving the perceived color of the image. The invention is described hereinafter in the context of an inkjet printer. However, it should be recognized that this method is applicable to other printing technologies as well.

Figure 1:
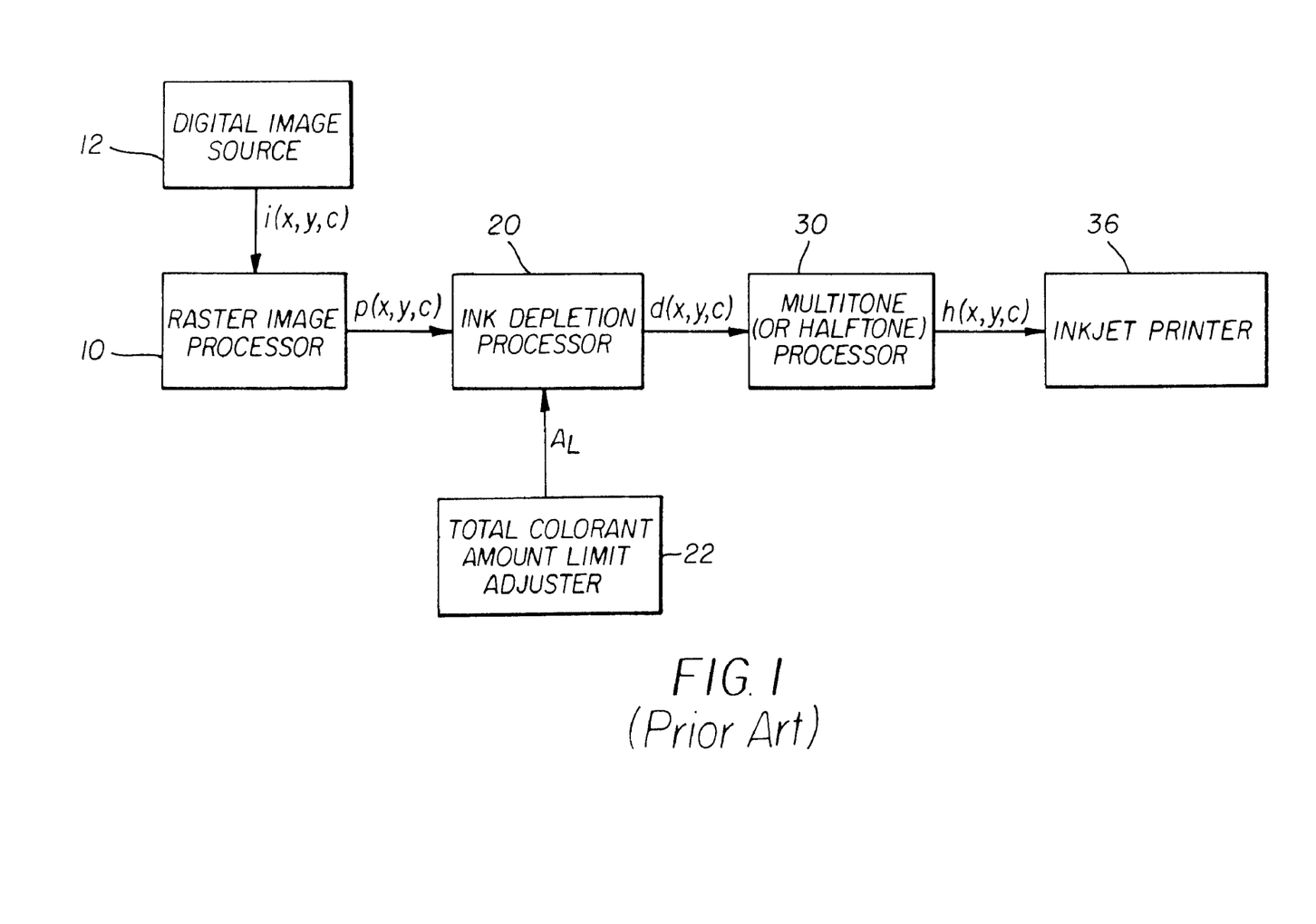
FIG. 1 is a flow diagram showing the placement of the ink depletion processor in an inkjet printer or printer driver.

Referring to FIG. 1, a generic image processing algorithm chain is shown for an inkjet printer in which a raster image processor 10 receives an input digital image i(x,y,c) from a digital image source 12, which may be a host computer, network, computer memory, or other digital image storage device. The input digital image i(x,y,c) is composed of a two-dimensional array of individual picture elements, or pixels, and can be represented as a function of two spatial coordinates, (x and y), and a color channel coordinate, c.

Each unique combination of the x-y spatial coordinates defines the location of a pixel within the image, wherein the pixel possesses input code values representing color levels for each color channel coordinate, c. Each input code value is typically represented by integer numbers on the range {0,255}. A typical set of color channels for an inkjet printer consists red (R), green (G) and blue (B), or cyan (C), magenta (M), yellow (Y), and black (K). (For an RGB image, the values for c would be 0,1,2. For a CMYK image, the values for c would be 0,1,2,3.)

The raster image processor 10 applies imaging algorithms to produce a processed digital image signal having printer code values p(x,y,c). The imaging algorithms that are applied in the raster image processor 10 can vary depending on the application, and are not fundamental to the present invention. The types of imaging algorithms applied in the raster image processor 10 typically include sharpening (sometimes called "unsharp masking" or "edge enhancement"), resizing (or spatial interpolation), and others. One particularly important type of imaging algorithm is the application of a color correction transform that converts from the source image color space (typically RGB) to the corresponding printer code values (typically CMYK). The color correction transform is typically designed to determine a set of printer code values that can be used to produce the desired color for a given set of input code values.

Following the raster image processor 10 of FIG. 1 is an ink depletion processor 20, which performs the function of reducing the total colorant amount (per pixel, or per unit area) below a specified total colorant amount limit to prevent image artifacts from occurring. The ink depletion processor 20 receives the printer code values p(x,y,c) and a total colorant amount limit $A_L$, and produces a depleted image signal having depleted code values d(x,y,c). The total colorant amount limit $A_L$ is provided by a total colorant amount limit adjuster 22, which is typically adjusted by the printer designer or an end user to provide acceptable image quality for a given ink and receiver media combination. The total colorant amount limit $A_L$ may also need to be adjusted as a function of environmental conditions such as temperature and humidity. In the context of an inkjet printer, the colorant amounts will be described in terms of ink volume per unit area (volume of colorant), but one skilled in the art will recognize that other metrics may be more convenient for computing the colorant amount for different printing technologies. Another example of the input colorant amount that can be used is the mass of colorant that is used in an electrophotographic printer.

There are many different methods presented in the prior art to accomplish this ink depletion operation. However, the prior art methods do not accurately preserve the perceived color of the image. As a result, it has been necessary to create a custom color correction transform any time the total colorant amount limit $A_L$ is adjusted. As will be described below, the present invention represents a new type of ink depletion processor 20, that substantially preserves the color of the image, making it possible to use the same color correction transform independent of the total colorant amount limit $A_L$.

Still referring to FIG. 1, the ink depletion processor 20 is followed by a multitone processor 30 which receives the depleted code values d(x,y,c) and produces a multitoned image signal h(x,y,c). The multitone processor 30 performs the function of reducing the number of bits used to represent each image pixel to match the number of printing levels available in the printer. Typically, the depleted code value d(x,y,c) will have 8 bits per pixel (per color channel), and the multitone processor 30 generally reduces this to 1 to 3 bits per pixel (per color) depending on the number of available printing levels for the particular printing technology. (In some cases, if the number of available printing levels is large enough, the use of a multitone processor 30 may be optional.) The multitone processor 30 may use a variety of different methods known to those skilled in the art to perform the multitoning. Such methods typically include error diffusion, clustered-dot dithering, or stochastic (blue noise) dithering. The particular multitoning method used in the multitone processor 30 is not fundamental to the present invention, but the ink depletion processor 20 is preferably applied prior to any multitone processor 30 in the imaging chain.

Finally, an inkjet printer 36 receives the multitoned image signal h(x,y,c), and deposits ink on the page at each pixel location according to the value of the multitoned image signal h(x,y,c) to produce the desired image. In a preferred embodiment of this invention, all of the pixels in the input digital image are sequentially processed through the image chain of FIG. 1, and sent to the inkjet printer 36, which typically prints the pixels in a raster scanned fashion.

Figure 2:
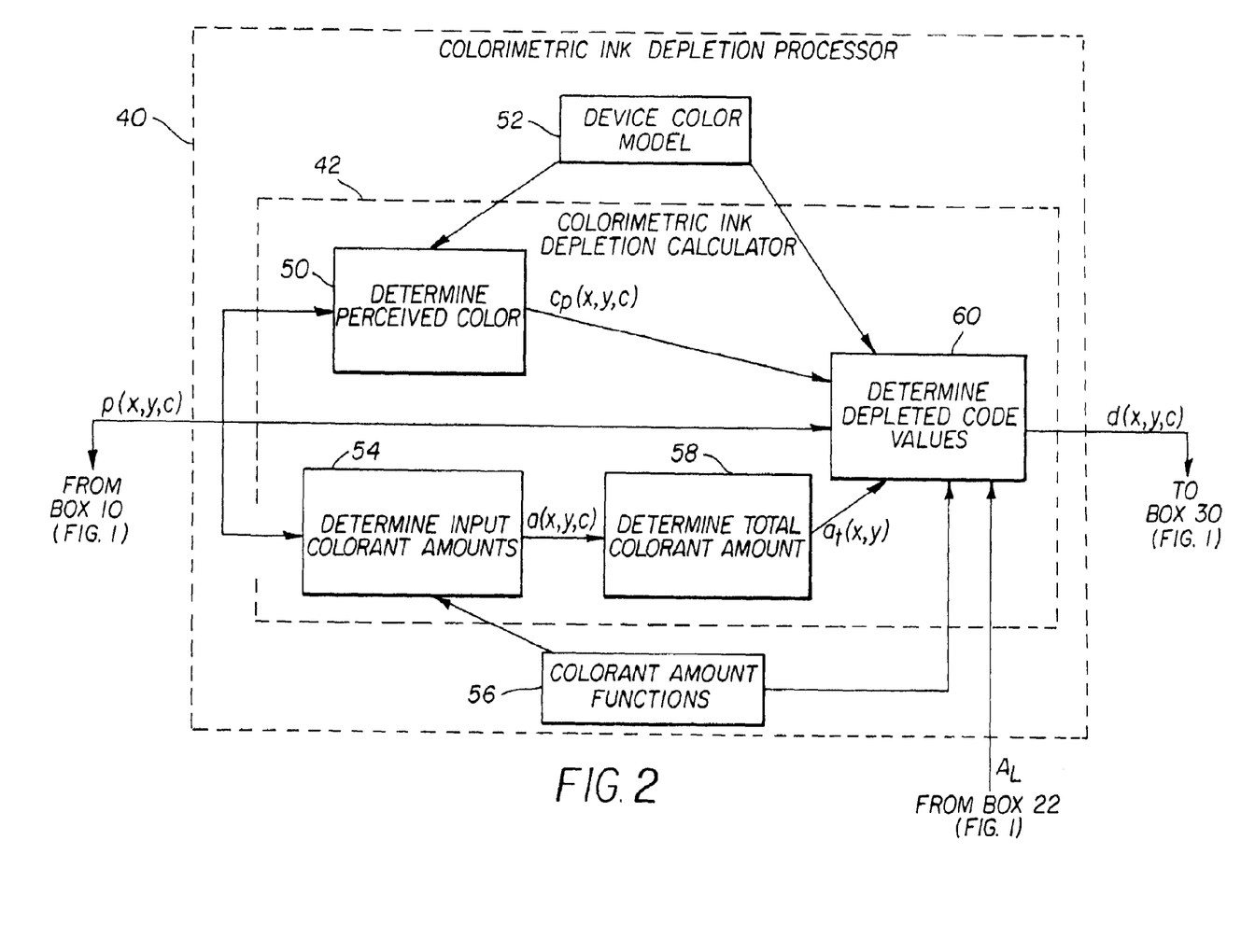
FIG. 2 is a flow diagram showing a preferred embodiment of the present invention.

Turning now to FIG. 2, a calorimetric ink depletion processor 40 is shown for use in the method of the present invention in place of the conventional ink depletion processor 20 of FIG. 1. The heart of the colorimetric ink depletion processor 40 is a calorimetric ink depletion calculator 42 that receives the printer code values p(x,y,c) and a total colorant amount limit $A_L$, and produces a depleted image signal having depleted code values d(x,y,c).

The colorimetric ink depletion calculator 42 uses a determine perceived color step 50 to determine an input perceived color $c_p$(x,y,c) corresponding to the printer code values p(x,y,c) using a device color model 52. Also, input colorant amounts a(x,y,c) are determined for each color channel using a determine input colorant amounts step 54 in response to the printer code value p(x,y,c) and colorant amount functions 56 for each color channel. The colorant amount functions 56 relate the printer code value for a particular color channel to the corresponding colorant amount for that color channel. A determine total colorant amount step 58 is then used to combine the input colorant amounts a(x,y,c) to determine a total colorant amount $a_t$(x, y).

If the total colorant amount $a_t$(x,y) is less than or equal to the total colorant amount limit $A_L$, no depletion is necessary and the depleted code values d(x,y,c) are simply set to be equal to the original printer code values p(x,y,c). However, if the total colorant amount $a_t$(x,y) is greater than the total colorant amount limit $A_L$, a determine depleted code values step 60 is used to determine depleted code values d(x,y,c) such that the depleted code values produce substantially the same perceived color according to the device color model 52 and wherein a depleted total colorant amount determined using the colorant amount functions 56 is less than or equal to the total colorant amount limit.

Each of the steps in FIG. 2 will now be discussed in more detail. The determine perceived color step 50 is used to determine an input perceived color $c_p$(x,y,c) corresponding to the printer code values p(x,y,c) using a device color model 52. In a preferred embodiment of the present invention, the perceived color $c_p$(x,y,c) is determined in terms of a calorimetric color space such as the well known CIELAB, CIELUV, or CIE XYZ color spaces. However, many other color spaces such as color appearance spaces (e.g., CIECAM97s) and densitometric color spaces could also be used. Many different forms of device color models 52 could be used to determine the perceived color $c_p(x,y,c)$. In a preferred embodiment of this invention, a multidimensional look-up table is used to store the perceived color $c_p(x,y,c)$ for a lattice of printer code values $p(x,y,c)$, and an interpolation method such as tri-linear interpolation or tetrahedral interpolation is used to interpolate between the stored perceived color values. Alternatively, other types of models, such as polynomial models or matrix/LUT models, could also be used. The device color model 52 will typically be determined by printing color patches corresponding to a set of different printer code values $p(x,y,c)$ and measuring the resulting perceived color using an instrument such as a calorimeter or a spectrophotometer. However, the device color model could also be based on predicted color values determined using an analytical model of the printer as will be known to one skilled in the art.

Figure 3:
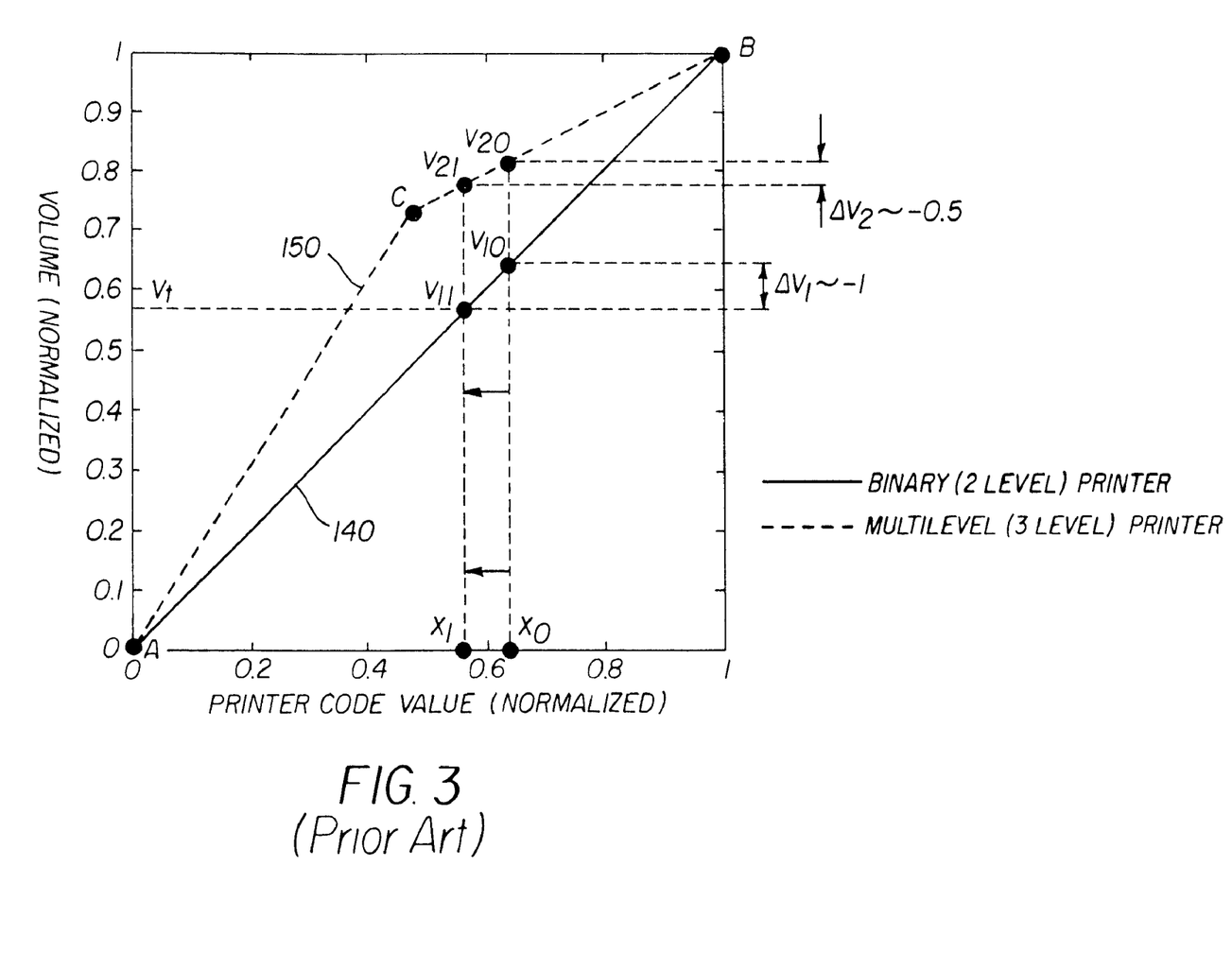
FIG. 3 is a graph showing example colorant amount functions.

The determine input colorant amounts step 54 is used to determine the colorant amount $a(x,y,c)$ for each color channel in response to the printer code value $p(x,y,c)$ and colorant amount functions 56. The form of the colorant amount functions 56 will be highly dependent on the particular printing technology. FIG. 3 shows an example of a colorant amount function that would be typical of a binary ink jet printer (solid line 140). In this case, the colorant amount is measured in terms of the ink volume per unit area which is linear with the printer code value $p(x,y,c)$ (normalized on the range $\{0,1\}$). Also shown on the same figure is a nonlinear colorant amount function (dashed line 150) that would be typical of a multilevel inkjet printer. These will be referred to hereinafter as the binary printer colorant amount function 140, and the multilevel printer colorant amount function 150.

A binary printer can eject either no drop (i.e., volume 0) as indicated by point "A", or one drop with normalized volume 1.0, as indicated by point "B" at each pixel. The multilevel printer can print these two, plus a smaller drop as indicated by point "C". (In this example, the smaller drop has a normalized drop volume of roughly 0.72.) Ink drops corresponding to points A, B, and C will be hereinafter referred to as "drop A", "drop B", and "drop C" respectively. For illustration purposes, the normalized code values that correspond to drops A, B, and C will be 0, 0.5, and 1.0, respectively. It is important to understand that even though the printers can eject discrete ink drops with fixed volumes at each pixel, it is possible to effectively have fractional colorant amounts at each pixel due to the halfioning (or multitoning) step.

Because of the different shapes of the colorant amount functions shown in FIG. 3, the result of reducing the printer code value by a fixed amount can produce significantly different effects. As an illustration, consider a printer system as shown in FIG. 1, but where the ink depletion processor 20 has been disabled. That is, the depleted code values $d(x,y,c)$ are set to be identical to the input printer code values $p(x,y,c)$. Consider the case where raster image processor 10 of FIG. 1 produces a normalized code value of 0.62, as indicated by the point $X_0$ of FIG. 3. In the case of the binary printer, the multitone (halftone) processor 30 generates a multitoned image signal for this pixel which has a 62% probability of being "on" (i.e., drop B with normalized drop volume 1.0 is ejected at this pixel), and a 38% probability of being "off" (i.e., no drop ejected at this pixel). Thus, conceptually, it can be seen that the average colorant amount per pixel for a normalized code value of 0.62 is 0.62 normalized volume units, as indicated by point $V_{10}$. Indeed, if an image containing 100 pixels all having a normalized code value of 0.62 is processed by the multitone processor 30 with 2 possible output levels, then 62 of the pixels in the multitoned image signal $h(x,y,c)$ would be "on" (drop B), and 38 would be "off" (drop A). This same calculation can be performed for any normalized code value between 0.0 and 1.0 to arrive at the binary printer colorant amount function 140 of FIG. 3.

The same calculation shown above can be repeated for an example multilevel printer to arrive at the multilevel printer colorant amount function 150 of FIG. 3. Consider in the case of a multilevel printer that the same normalized code value of 0.62 is produced by the raster image processor 10 of FIG. 1, and that the ink depletion processor 20 is still disabled as in the above example. In this case, the multitone processor 30 will generate a multitoned image signal $h(x,y,c)$ that has a $(0.62-0.50)/(1.00-0.50) \times 100 = 24\%$ chance of being a drop B, and a $100-24=76\%$ chance of being a drop C. Thus, if an image containing 100 pixels all having a normalized code value of 0.62 is processed by the multitone processor 30 with 3 possible output levels, then 24 of the pixels in the multitoned image signal $h(x,y,c)$ would be drop B, and 76 would be drop C. Thus, the normalized drop volume per pixel produced by the multilevel printer for a normalized code value of 0.62 can be computed by simple linear interpolation between the normalized volumes of drop C and drop B according to $(0.24)(1.0)+(0.76)(0.72)=0.79$, as indicated by point $V_{20}$. This same calculation can be performed for any normalized code value between 0.0 and 1.0 to arrive at the multilevel printer colorant amount function 150 of FIG. 3.

Now consider the case where the printer code value is depleted, reducing the normalized code value from $X_0$ to $X_1$. In the case of the binary printer colorant amount function 140, the normalized drop volume per pixel is decreased by $\Delta V_1$ (from $V_{10}$ to $V_{11}$). And in the case of the multilevel printer colorant amount function 150, the normalized drop volume per pixel is decreased by $\Delta V_2$ from $V_{20}$ to $V_{21}$, which can be seen to be significantly less than $\Delta V_1$.

Thus, in order to accurately control the colorant amount, it is critical to know the appropriate form of the colorant amount functions 56 of FIG. 2. In some cases, such as when a plurality of inks having substantially the same color but different densities (e.g., light cyan and dark cyan) are controlled by a single input code value corresponding to a single color channel, the colorant amount functions may be even more complicated than those shown in this example, and may even be non-monotonic.

In a preferred embodiment of the present invention, the colorant amount functions 56 are stored as one-dimensional look-up tables, but other functional forms are also possible. The colorant amount functions may be based on measured colorant amounts, or on theoretical colorant amounts determined from an understanding of the characteristics of the output device.

Once the input colorant amounts $a(x,y,c)$ have been determined, the determine total colorant amount step 58 is used to determine the total colorant amount $a_t(x,y)$. Typically this will be done by simply adding the input colorant amounts $a(x,y,c)$ for each of the color channels.

Figure 4:
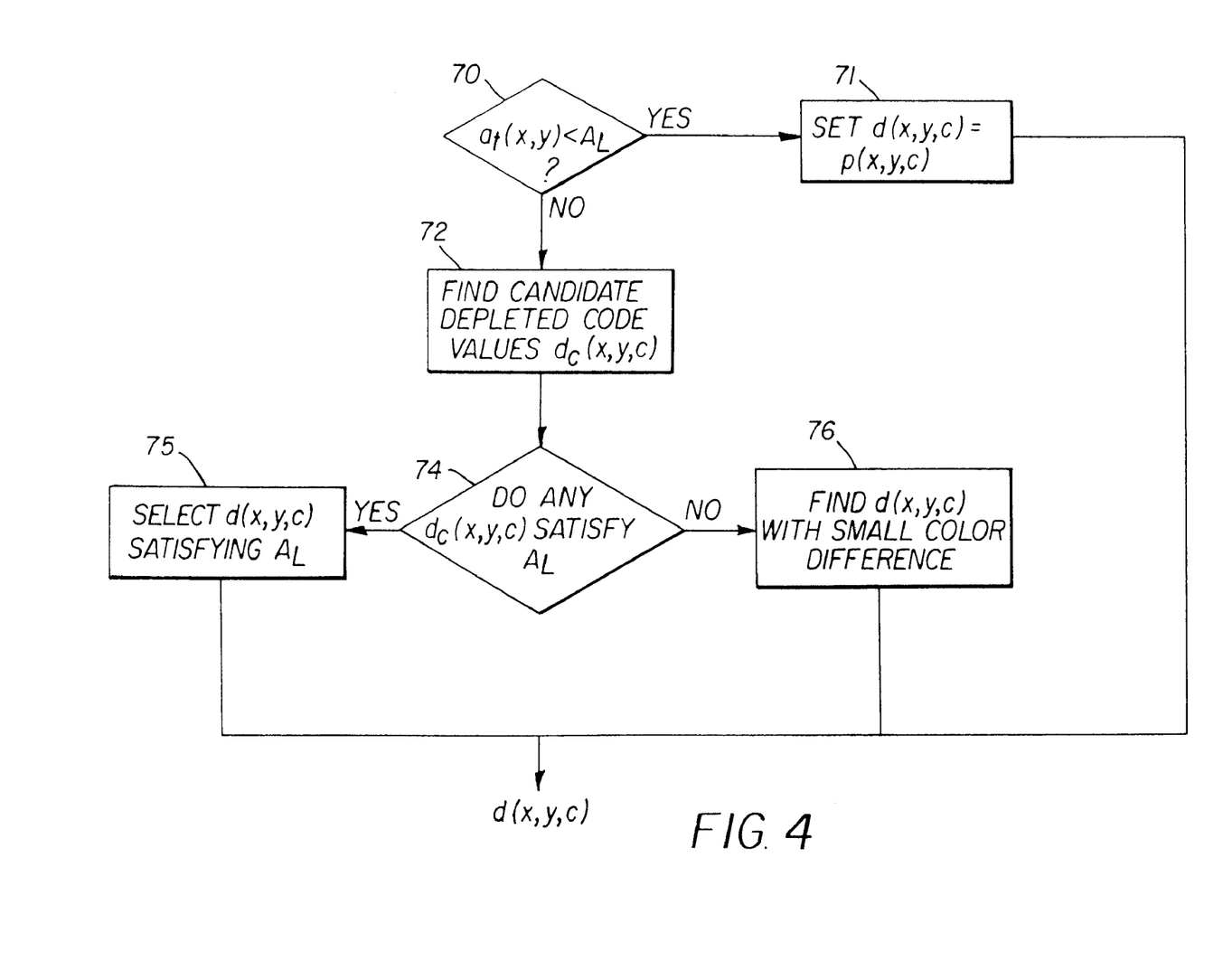
FIG. 4 is a flow diagram showing details for the determine depleted code values step 60 of FIG. 2.

Next, the determine depleted code values step 60 is used to determine depleted code values $d(x,y,c)$ that satisfy the colorant amount limit and produce substantially the same perceived color as the original printer code values $p(x,y,c)$. There are many ways that this can be accomplished. A flowchart showing a preferred method is shown in FIG. 4. First, the total colorant amount $a_t(x,y)$ is compared to the total colorant amount limit $A_L$ using a comparator 70. If the total colorant amount $a_t(x,y)$ is less than or equal to the total colorant amount limit $A_L$, no depletion is necessary and the calorimetric ink depletion calculator simply sets the depleted code values d(x,y,c) to be equal to the original printer code values p(x,y,c) using a setting step 71.

However, if the total colorant amount $a_t(x,y)$ is greater than the total colorant amount limit $A_L$, a find candidate depleted code values step 72 is used to determine a set of candidate depleted code values $d_c(x,y,c)$ that produce substantially the same perceived color as the input perceived color $c_p(x,y,c)$ corresponding to the original printer code values p(x,y,c). For printers having four or more color channels, there will generally be many ways to make a particular perceived color using different code value combinations. For example, for the case of a CMYK printer it will generally be possible to trade off the amount of black ink against the levels of the cyan, magenta, and yellow inks to produce the same perceived color. It can be shown that there will typically be a range of black levels between a minimum black level and a maximum black level within which it is possible to produce a given perceived color. For more details, see commonly assigned U.S. Pat. No. 5,553,199 by Spaulding, et al., which is incorporated herein by reference. In this case, the set of candidate depleted code values $d_c(x,y,c)$ would be comprised of a set of CMYK values having black levels between the minimum black level and the maximum black level. The corresponding levels for the cyan, magenta and yellow channels at each black level can be determined by inverting the device color model 52. (For a given black level, the device color model 52 will reduce down to a three-dimensional device model that can be inverted by a wide variety of different methods that are well known to one skilled in the art.) For printers with more than four color channels, the method taught in commonly assigned U.S. patent application Ser. No. 10/845,037 filed May 13, 2004, by Gustav J. Braun, et al., entitled Determining Sets Of N-Dimensional Colorant Control Signals, the disclosure of which is herein incorporated by reference, can be used to determine the set of candidate depleted code values $d_c(x,y,c)$.

Next, a colorant amount test 74 is used to evaluate the total colorant amounts corresponding to the set of candidate depleted code values $d_c(x,y,c)$. The colorant amounts for each member of the set can be determined as described earlier with reference to FIG. 2. In particular, the determine input colorant amounts step 54 is used to determine the colorant amount for each color channel in response to the candidate depleted code values $d_c(x,y,c)$ using the colorant amount functions 56. The colorant amounts for each color channel are then combined to determine the total colorant amount for each member of the set of candidate depleted code values $d_c(x,y,c)$.

If total colorant amounts for none of the members of the set of candidate depleted code values $d_c(x,y,c)$ are less than the colorant amount limit $A_L$, then it will not be possible to produce the exact perceived color while maintaining the colorant amount constraint. In this case, it will generally be preferable to compromise slightly on the perceived color rather than violating the colorant amount constraint in order to prevent the objectionable artifacts that are associated with using too much colorant. A find depleted code value with small color difference step 76 is then used to find appropriate depleted code values d(x,y,c). There are many ways that this step could be accomplished. For example, the depleted code values producing the smallest perceived color error while satisfying the colorant amount constraint could be identified. One method to do this would be to define a reduced color gamut containing only those colors that can be produced within the colorant amount constraint, and then applying conventional gamut mapping algorithms to map the input perceived color to a modified perceived color that is within the reduced color gamut. In a preferred embodiment of the present invention, a cost function method such as described in commonly assigned U.S. patent application Ser. No. 10/310,009 filed Dec. 4, 2002 by Gustav J. Braun, et al., entitled "Color Gamut Mapping Using a Cost Function", the disclosure of which is herein incorporated by reference, is used to determine the reduced color gamut.

For cases where the total colorant amount for at least one member of the set of candidate depleted code values $d_c(x,y,c)$ is less than the colorant amount limit $A_L$, a select depleted code value step 75 is used to select a member of the set of candidate depleted code values $d_c(x,y,c)$. There are many ways that this step could be accomplished. In a preferred embodiment of the present invention, the member of the set of candidate depleted code values $d_c(x,y,c)$ that are most similar to the input printer code values p(x,y,c) are selected. For the case of a CMYK printer, one means to do this is to select the member of the set of candidate depleted code values $d_c(x,y,c)$ where the black level is closest to the black level of the original printer code values p(x,y,c). Other methods can also be used such as selecting optimal depleted code values d(x,y,c) by minimizing a cost function responsive to one or more cost attributes as taught in commonly assigned U.S. patent application Ser. No. 10/309,866 filed Dec. 4, 2002 by Douglas W. Couwenhoven, et al., entitled "Calibrating a Digital Printer Using a Cost Function", the disclosure of which is herein incorporated by reference.

The colorant reduction process that has been described heretofore can be applied to an input digital image one a pixel-by-pixel basis to determine a resulting depleted digital image. Alternatively, a colorant reduction transform can be determined which can subsequently be applied to the image. This has the advantage that it will generally be more computationally efficient since most of the computationally intensive calculations only need to be done once when the colorant reduction transform is created. In a preferred embodiment of the present invention, a multidimensional look-up table is used to store the colorant reduction transform. The multidimensional look-up table can be created by applying the colorant reduction process to a lattice of printer code values, and then storing the depleted code values for each node of the lattice. The colorant reduction transform can then be used to modify an input digital image by interpolating between the stored lattice nodes of the multidimensional look-up table using well known interpolation techniques.

In many applications, the colorant reduction transform may be applied immediately following a color correction transform that transforms the input digital image from an input color space to the corresponding printer code values. In such cases, it may be desirable to combine the color correction transform and the colorant reduction transform to form a combined color processing transform. For example, if the color correction transform and the colorant reduction transform are both represented as multidimensional look-up tables, the two look-up tables can be cascaded together to form a single combined color processing transform look-up table. This has the advantage that it will generally be more computationally efficient to process the image through one transform rather than two. The two transforms can either be combined once, and then stored for use with each image that is to be printed, or can be combined just before processing a given image.

The invention has been described in detail with particular reference to certain preferred embodiments thereof, but it will be understood that variations and modifications can be effected within the spirit and scope of the invention. In particular, the present invention has been described in the context of an inkjet printer which prints with cyan, magenta, yellow, and black colorants, but in theory the invention should apply to other types of printing technologies also. This includes multilevel inkjet printing in which more than three printing levels are available for at least one colorant at each pixel. Also, the invention can be applied to inkjet printers in which additional colorants, such as light cyan, light magenta, orange, or green inks are used.

PARTS LIST 10 raster image processor
12 digital image source
20 ink depletion processor
22 total colorant amount limit adjuster
30 multitone (or halftone) processor
36 inkjet printer
40 colorimetric ink depletion processor
42 calorimetric ink depletion calculator
50 determine perceived color step
52 device color model
54 determine input colorant amounts step
56 colorant amount functions
58 determine total colorant amount step
60 determine depleted code values step
70 comparator
71 setting step
72 find candidate depleted code values step
74 colorant amount test
75 select depleted code value step
76 find depleted code value with small color difference step
140 binary printer colorant amount function
150 multilevel printer colorant amount function

What is claimed is:

1. A method for modifying an input digital image having an (x,y) array of image pixels, each image pixel having an input code value for each of four or more color channels, to produce a depleted digital image having depleted code values that substantially preserve perceived color and which are subject to a total colorant amount limit, comprising the steps of:
   a) determining an input perceived color corresponding to the input code values using a device color model;
   b) determining an input colorant amount for each color channel in response to the corresponding input code value and a colorant amount function that relates the input code value to the colorant amount for the corresponding color channel;
   c) determining a total input colorant amount by combining the input colorant amounts for each color channel;
   d) for image pixels where the total input colorant amount exceeds the total colorant amount limit, determining depleted code values for each color channel such that the depleted code values produce substantially the input perceived color according to the device color model and wherein the total colorant amount corresponding to the depleted code values is less than or equal to the total colorant amount limit; and
   e) repeating steps (a) through (d) for a plurality of pixels in the input digital image.

2. The method of claim 1 wherein the input colorant amount is a volume of colorant.

3. The method of claim 1 wherein the input colorant amount is a mass of colorant.

4. The method of claim 1 wherein the four or more color channels include cyan, magenta, yellow, and black color channels.

5. The method of claim 1 wherein at least one of the input code values controls a plurality of colorants.

6. The method of claim 5 wherein a single input code value controls two or more colorants having substantially the same color but different densities.

7. The method of claim 1 further including the step of printing the depleted digital image.

8. The method of claim 1 wherein the perceived color is represented by the CIELAB color space.

9. The method of claim 1 wherein step d) includes the steps of:
   i) determining a set of candidate depleted code values that produce substantially the input perceived color according to the device color model and wherein the total colorant amount corresponding to the depleted code values is less than or equal to the total colorant amount limit; and
   ii) selecting the depleted code values from the set of candidate depleted code values.

10. The method of claim 9 wherein the depleted code values that are most similar to the input code values are selected from the set of candidate depleted code values.

11. The method of claim 9 wherein the depleted code values are selected by minimizing a cost function responsive to one or more cost attributes.

12. The method of claim 1 wherein step d) includes the steps of:
   i) determining a set of candidate depleted code values that produce substantially the input perceived color according to the device color model;
   ii) determining a modified perceived color that is achievable within the total colorant amount limit when all of the candidate depleted code values have a total colorant amount greater than the total colorant amount limit; and
   iii) determining depleted code values for each color channel such that the depleted code values produce substantially the modified perceived color and wherein the total colorant amount corresponding to the depleted code values is less than or equal to the total colorant amount limit.

13. The method of claim 12 wherein the modified perceived color is determined that has the smallest perceived color error relative to the input perceived color.

14. The method of claim 12 wherein the modified perceived color is determined using a cost function responsive to one or more cost attributes.

15. A colorant reduction transform for modifying an input digital image having an (x,y) array of image pixels, each image pixel having an input code value for each of four or more color channels to produce a depleted digital image having depleted code values that substantially preserve perceived color and which are subject to a total colorant amount limit, wherein the colorant reduction transform performs the steps of:
   a) determining an input perceived color corresponding to the input code values using a device color model;
   b) determining an input colorant amount for each color channel in response to the corresponding input code value and a colorant amount function that relates the input code value to the colorant amount for the corresponding color channel;
   c) determining a total input colorant amount by combining the input colorant amounts for each color channel; and
   d) for input code values where the total input colorant amount exceeds the total colorant amount limit, determining depleted code values for each color channel such that the depleted code values produce substantially the input perceived color according to the device color model and wherein the total colorant amount corresponding to the depleted code values is less than or equal to the total colorant amount limit.

16. The method of claim 15 wherein the colorant reduction transform is a multidimensional look-up table that stores the depleted code values for a lattice of input code values.

17. The method of claim 15 further including the step of using the colorant reduction transform to modify an input digital image to produce a depleted digital image.

18. The method of claim 15 further including the step of combining a color correction transform with the colorant reduction transform to form a combined color processing transform.

* * * * *